United States Patent [19]

Barger, Jr. et al.

[11] 3,948,681

[45] Apr. 6, 1976

[54] FUEL CELL UTILIZING DIRECT HYDROCARBON OXIDATION

[75] Inventors: Hugh J. Barger, Jr., Woodbridge; Alayne A. Adams, Lee District, both of Va.

[73] Assignee: The United States of America as represented by the Secretary of the Army, Washington, D.C.

[22] Filed: Feb. 28, 1974

[21] Appl. No.: 446,886

[52] U.S. Cl. ............... 136/86 D; 136/86 E; 136/155
[51] Int. Cl.² .......................................... H01M 8/10
[58] Field of Search ....... 136/86 E, 86 R, 155, 86 D

[56] References Cited
UNITED STATES PATENTS

| | | | |
|---|---|---|---|
| 3,413,153 | 11/1968 | Metzger et al. | 136/155 X |
| 3,432,358 | 3/1969 | Cairns | 136/155 X |

*Primary Examiner*—Allen B. Curtis
*Attorney, Agent, or Firm*—Nathan Edelberg; Robert P. Gibson; Glenn S. Ovrevik

[57] ABSTRACT

A fuel cell utilizing direct hydrocarbon oxidation is disclosed. The fuel cell comprises an anode, a cathode, a fuel compartment, an oxidant compartment, a compartmented electrolyte chamber and an electrolyte disposed in the compartmented electrolyte chamber. The basic electrolyte utilized is the monohydrate of trifluoromethyl sulfonic acid $CF_3SO_3H \cdot H_2O$.

3 Claims, 1 Drawing Figure

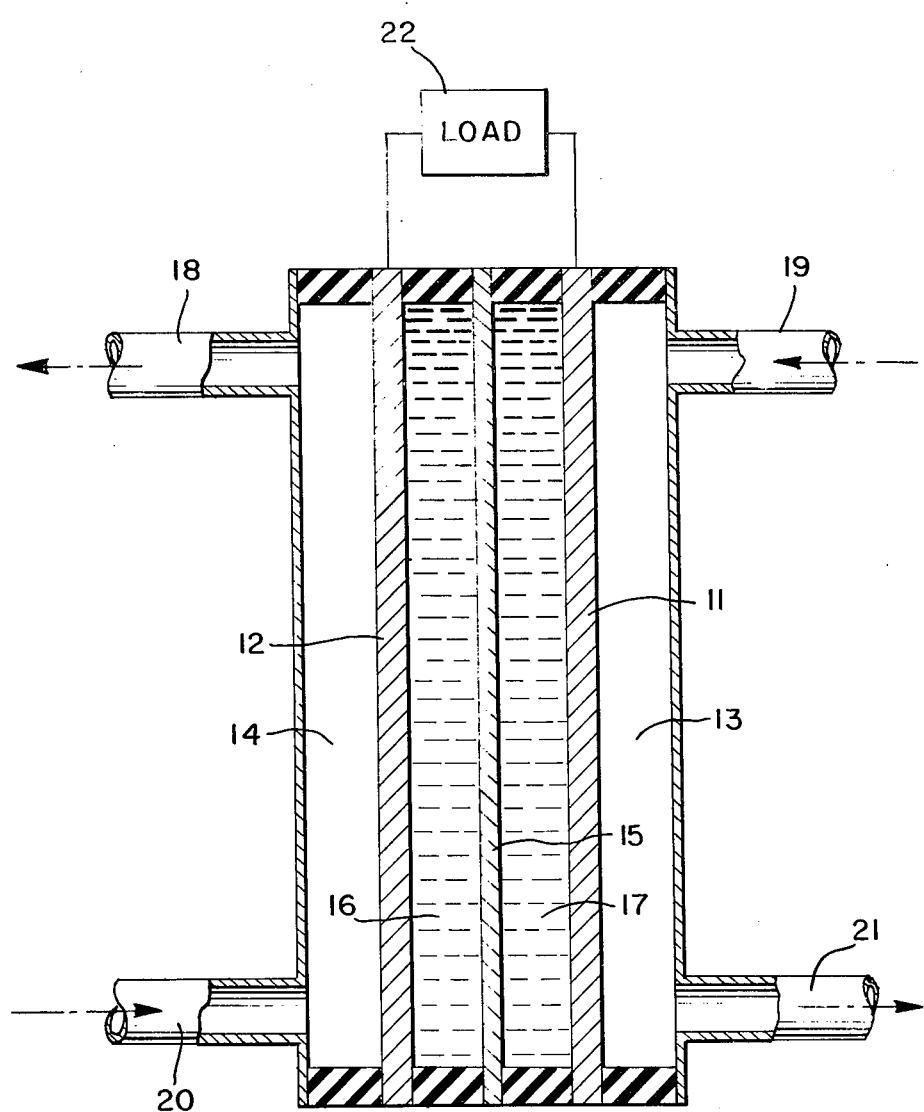

FUEL CELL UTILIZING DIRECT HYDROCARBON OXIDATION

The invention described herein may be manufactured, used, and licensed by or for the Government for Governmental purposes without the payment to me of any royalties thereon.

BACKGROUND OF THE INVENTION

The invention relates to fuel cells; and more particularly, to direct hydrocarbon oxidation fuel cells. Direct hydrocarbon oxidation fuel cells are fuel cells in which the hydrocarbon fuel is employed directly with the oxidation occurring in the fuel electrode.

Large sums of money and many man-years have been expended in research directed toward the development of fuel cells capable of producing electrical power from hydrocarbon reactants. Prior to this invention, this research effort had not resulted in the development of a practical direct hydrocarbon oxidation fuel cell due to the slow rates of hydrocarbon oxidation.

It is well recognized in the field that hydrocarbon electrooxidation is influenced by the electrolyte utilized. Thus, much of the prior effort has been directed to the use of strong acids such as phosphoric acid, sulfuric acid, sulfonic acid or hydrofluoric acid and the like as the electrolyte. Unfortunately, these acids all have various drawbacks. For example, these acids when used in fuel cell conditions are either physically or chemically unsuitable or they tend to have low conductivity or poor $CO_2$ rejection qualities. This invention provides a practical fuel cell utilizing direct hydrocarbon oxidation that overcomes the major problems of the prior art direct hydrocarbon oxidation fuel cells.

SUMMARY OF THE INVENTION

A preferred embodiment of the fuel cell of the invention uses the monohydrate of trifluoromethyl sulfonic acid ($CF_3SO_3H.H_2O$) as the electrolyte. The fuel cell comprises an anode electrode, a cathode electrode, a fuel compartment adjacent the anode electrode, an oxidant compartment adjacent the cathode electrode and an electrolyte chamber. The electrolyte chamber is divided into two compartments by an ion exchange membrane. In a fuel cell utilizing direct hydrocarbon oxidation, the characteristics required by the electrolyte which influences the hydrocarbon electrooxidation are $CO_2$ rejection qualities, chemical and physical stability, high conductivity and, of course, the ability to enhance the hydrocarbon electrooxidation. The monohydrate of trifluoromethyl sulfonic acid has been found to possess these qualities when used as the electrolyte in the fuel cell of this invention. Also variations of this electrolyte have been found to possess these qualities.

It is, therefore, an object of this invention to provide a fuel cell.

It is another object of this invention to provide a fuel cell in which a direct oxidation reaction of hydrocarbon fuel takes place.

It is still another object of this invention to provide a fuel cell system in which the reactivity of a hydrocarbon fuel is greatly increased over such prior art fuel cell systems.

It is a further object of this invention to provide a fuel cell capable of using a low cost, readily available hydrocarbon as a fuel.

It is still a further object of this invention to provide a fuel cell using the monohydrate of trifluoromethyl sulfonic acid as the electrolyte.

BRIEF DESCRIPTION OF THE DRAWING

The above-mentioned and other objects of the invention will become readily apparent from the following detailed description when read in conjunction with the annexed drawing in which the single FIGURE shows a fuel cell constructed in accordance with this invention.

DETAILED DESCRIPTION OF THE INVENTION

Referring to the drawing, the single FIGURE shows a fuel cell having a cathode 11 and an anode 12. An oxidant compartment 13 is positioned adjacent cathode 11. Compartment 13 has an inlet port 19 and an outlet port 21. A fuel compartment 14 is positioned adjacent anode 12. Compartment 14 is provided with an inlet port 20 and an outlet port 18. An electrolyte chamber having the two compartments 16 and 17 is positioned between cathode 11 and anode 12. The electrolyte chamber is divided into the two compartments 16 and 17 by an ion exchange membrane 15. Any load, such as the load 22, would of course be connected between anode 12 and cathode 11. Normally conventional battery terminals for connecting a load to the battery would be provided. The battery terminals could be any type of suitable terminal and for this reason no terminal structure is shown. In addition, load 22 is not a part of this invention. Load 22 is shown merely to show the battery on load.

The above discussion provides a description of the basic fuel cell construction. In a preferred embodiment of this basic construction, the cathode and anode are constructed from a noble metal such as platinum mixed with carbon and Teflon and supported on graphite. The ion exchange member 15 is made from an inert material such as tantalum oxide. The ion exchange member 15 is a cloth of tantalum oxide or alternatively, the electrolyte could be trapped in the pores of a matrix made of tantalum oxide. Either the cloth or the matrix is satisfactory. Oxidant compartment 13 contains any suitable known oxidizing agent such as air or oxygen and, of course, a hydrocarbon fuel is housed in fuel compartment 14. The electrolyte is the monohydrate of trifluoromethyl sulfonic acid ($CF_3SO_3H.H_2O$). This monohydrate when used as a fuel cell electrolyte exhibits those characteristics necessary for providing a practical fuel cell utilizing direct hydrocarbon oxidation. These characteristics are good $CO_2$ rejecting qualities, chemical and physical stability, high conductivity, and the ability to enhance hydrocarbon electro-oxidation.

Trifluoromethyl sulfonic acid is one of the strongest acids known; however, this acid is not satisfactory as an electrolyte for a direct hydrocarbon oxidation fuel cell since it has an appreciable vapor pressure above 100° which is a temperature minimum for hydrocarbon oxidation. This acid does form a stable azeotrope and this stable azeotrope is the monohydrate $CF_3SO_3H.H_2O$ which is used as the electrolyte in the fuel cell of this invention.

As was mentioned above, 100°C is a temperature minimum for hydrocarbon oxidation. Thus it may be necessary to add heat to the fuel cell of this invention. Such heat can be provided by any suitable means such as infrared lamps or the like. No heat source is shown in the FIGURE since any suitable heat source can be used if a heat source must be provided.

During the development of this invention several experiments were conducted to demonstrate the utility of $CF_3SO_3H.H_2O$ as the electrolyte in a direct hydrocarbon oxidation fuel cell. In one of these experiments, measurements using the monohydrate $CF_3SO_3H.H_2O$ of this invention for the hydrocarbon oxidation were compared against measurements using 85% $H_3PO_4$ (in $H_2O$) for the hydrocarbon oxidation. $H_3PO_4$ is an electrolyte often used for hydrocarbon oxidation. To perform these measurements the working electrode used was a platinum wire mesh immersed in the electrolyte. Current measurements were taken and normalized for surface area for various polarizations using propane as the reactant. The results of these measurements are given in the table below:

| Volts | 85% $H_3PO_4$(135°C) | $CF_3SO_3H.H_2O$(115°C) | $CF_3SO_3H.H_2O$(135°C) |
| --- | --- | --- | --- |
| 0.4 | 1.95 $\mu a/CM^2$ | 1.6 $\mu a/CM^2$ | 3.4 $\mu a/CM^2$ |
| 0.5 | 5.2 $\mu a/CM^2$ | 4 $\mu a/CM^2$ | 18.3 $\mu a/CM^2$ |
| 0.6 | 4.7 $\mu a/CM^2$ | 9 $\mu a/CM^2$ | 56 $\mu a/CM^2$ |
| Limiting Current | 5.6 $\mu a/CM^2$ | 16 $\mu a/CM^2$ | 90 $\mu a/CM^2$ |

From the above table of results, it is apparent that the performance of $CF_3SO_3H.H_2O$ at 115°C was 200% better than the performance of $H_3PO_4$ at 135°C and when the temperature of $CF_3SO_3H.H_2O$ was raised to 135°C the performance was more than 1000% above that of $H_3PO_4$ at 135°C. Thus, these measurements clearly show that this invention provides a direct hydrocarbon oxidation fuel cell providing superior performance as compared to such prior art fuel cells. Note that the limiting currents shown in the above table represent an important measurement since open circuits varied somewhat due to impurities (especially oxygen) in the electrochemical cell.

Thus far only the monohydrate $CF_3SO_3H.H_2O$ has been mentioned as the electrolyte for the fuel cell of this invention. This monohydrate is the preferred electrolyte; however, it has been found that higher homologues of $CF_3SO_3H.H_2O$ also perform satisfactorily and that different acid to $H_2O$ ratios can also be used. These are, of course all variations of the basic monohydrate $CF_3SO_3H.H_2O$. The variations that perform satisfactorily are those that exhibit the required characteristics discussed above. In addition, it should be pointed out that the electrolyte $CF_3SO_3H.H_2O$ and the variations mentioned can also be used as the electrolyte in hydrogen-air fuel cells and with other oxidizable organic fuels.

While the invention has been described in detail with reference to a specific embodiment, it should be apparent that various modifications and changes, other than the variations of the electrolyte specifically mentioned, can be made without departing from the spirit and scope of the invention as set forth in the claims.

What is claimed is:

1. A fuel cell of the direct hydrocarbon oxidation variety comprising a container in which is disposed a fuel, a first planar electrode with one face thereof in contact with said fuel, an oxidizing agent, a second planar electrode with one face thereof in contact with said oxidizing agent, and an electrolyte in contact with the other face of each of said first and second electrodes, said electrolyte being the compound $CF_3SO_3H.H_2O$, said compound being a monohydrate of fluorine and carbon sulfonic acid and having a liquid state at the operating temperature of said fuel cell.

2. The fuel cell as defined in claim 1 in which said first and second electrodes are composed of a platinum mixture.

3. The fuel cell as defined in claim 2 in which said fuel is disposed in a first compartment provided with an inlet and an outlet port and said oxidizing agent is disposed in a second compartment provided with an inlet and outlet port.

* * * * *